United States Patent
Carter et al.

(10) Patent No.: US 12,056,946 B2
(45) Date of Patent: Aug. 6, 2024

(54) METHOD AND SYSTEM TO ALIGN QUANTITATIVE AND QUALITATIVE STATISTICAL INFORMATION IN DOCUMENTS

(71) Applicant: Toyota Research Institute, Inc., Los Altos, CA (US)

(72) Inventors: Scott Carter, San Jose, CA (US); Alexandre Filipowicz, Mountain View, CA (US); Rumen Iliev, Millbrae, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 352 days.

(21) Appl. No.: 17/400,777

(22) Filed: Aug. 12, 2021

(65) Prior Publication Data

US 2023/0046539 A1 Feb. 16, 2023

(51) Int. Cl.
| G06V 30/40 | (2022.01) |
| G06F 1/03 | (2006.01) |
| G06V 10/75 | (2022.01) |
| G06V 30/19 | (2022.01) |
| G06V 30/41 | (2022.01) |

(52) U.S. Cl.
CPC ............ *G06V 30/40* (2022.01); *G06F 1/03* (2013.01); *G06V 10/758* (2022.01); *G06V 30/19073* (2022.01); *G06V 30/41* (2022.01)

(58) Field of Classification Search
CPC .... G06F 1/03; G06V 30/19073; G06V 30/41; G06V 30/413
See application file for complete search history.

(56) References Cited

U.S. PATENT DOCUMENTS

| 10,223,455 | B2* | 3/2019 | Musuluri | G06F 16/9535 |
| 2010/0174754 | A1* | 7/2010 | B'Far | G06F 16/252 |
| | | | | 707/794 |
| 2011/0301941 | A1* | 12/2011 | De Vocht | G06F 16/3344 |
| | | | | 704/9 |
| 2016/0259841 | A1* | 9/2016 | Andrew | G06Q 50/16 |
| 2017/0351708 | A1 | 12/2017 | Lahmann et al. | |
| 2018/0211108 | A1 | 7/2018 | Lahmann et al. | |
| 2018/0276462 | A1* | 9/2018 | Davis | G06V 30/416 |

FOREIGN PATENT DOCUMENTS

| CN | 111143544 A | 5/2020 |
| CN | 112651315 A | 4/2021 |
| JP | H09134404 A | 5/1997 |

OTHER PUBLICATIONS

Automatic extraction of data from bar charts (https://dl.acm.org/doi/10.1145/2815833.2816956), Oct. 7, 2015.

* cited by examiner

*Primary Examiner* — Akwasi M Sarpong
*Assistant Examiner* — Michael L Burleson
(74) *Attorney, Agent, or Firm* — DINSMORE & SHOHL LLP

(57) ABSTRACT

A method comprises identifying a representation of first statistical information in a document, identifying descriptive text that describes the first statistical information, determining whether the descriptive text accurately describes the first statistical information, and upon determination that the descriptive text does not accurately describe the first statistical information, generating alternative descriptive text that accurately describes the first statistical information.

18 Claims, 6 Drawing Sheets

METHOD AND SYSTEM TO ALIGN QUANTITATIVE AND QUALITATIVE STATISTICAL INFORMATION IN DOCUMENTS

TECHNICAL FIELD

The present specification relates to data science, and more particularly, to a method and system to align quantitative and qualitative statistical information in documents.

BACKGROUND

Written communication often includes charts, graphs, or other quantitative representations of statistical evidence or information. However, qualitative textual descriptions of such statistical information is often lacking or presented in an inaccurate or misleading manner. Accordingly, a need exists for a method and system to align quantitative and qualitative statistical information in documents.

SUMMARY

In an embodiment, a method may include identifying a representation of first statistical information in a document, identifying descriptive text that describes the first statistical information, determining whether the descriptive text accurately describes the first statistical information, and upon determination that the descriptive text does not accurately describe the first statistical information, generating alternative descriptive text that accurately describes the first statistical information.

In another embodiment, a system may include a processing device and non-transitory, processor-readable storage medium comprising one or more programing instructions stored thereon. When executed, the programming instructions may cause the processing device to identify a representation of first statistical information in a document, identify descriptive text that describes the first statistical information, determine whether the descriptive text accurately describes the first statistical information, and upon determination that the descriptive text does not accurately describe the first statistical information, generate alternative descriptive text that accurately describes the first statistical information.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein describe a method and system to align quantitative and qualitative statistical information in documents. Documents often include quantitative statistical information in the form of graphs, charts, plots, or other figures or visual representations of data. Documents may also include quantitative statistical information in the form of text such as data tables.

In addition to quantitative statistical information, documents may also include qualitative statistical information. Qualitative statistical information may include descriptive text that describes a statistical result or relationship in a graph or other form of quantitative statistical information. However, the qualitative statistical information may not always match the quantitative statistical information. That is, a description of a statistical result in a document may not be accurate. For example, descriptive text in a document that describes a statistical result from a figure may not accurately describe the statistics in the figure. This may be due to an error by the author or may be due to the author intentionally misleading an audience by misrepresenting certain statistical information in the document.

If descriptive text in a document inaccurately describes a figure or other quantitative statistical information, a reader may not take the time or may not have the knowledge or ability to check that the description is accurate. As such, the reader may be misled by the descriptive text. Accordingly, described herein is a method and system to align quantitative and qualitative statistical information in documents.

In embodiments disclosed herein, a system may analyze an electronic document to identify quantitative statistical information in the document, such as a graph or other figure. The system may then determine a statistical profile of the graph. The statistical profile may comprise one or more statistical results or relationships in the graph.

The system may then identify descriptions of the graph in the text of the document. The system may analyze a description of the graph and compare the description to the statistical profile determined for the graph. The system may then determine whether the description accurately conveys the statistical information in the graph. If the description is inaccurate, the system may generate an alternative description that accurately describes the statistical information in the graph and/or corrects any errors in the original description of the graph in the document. Alternatively, if the document does not contain any descriptions of the graph, the system may generate a description of the graph based on the determined statistical profile.

Figure 1:
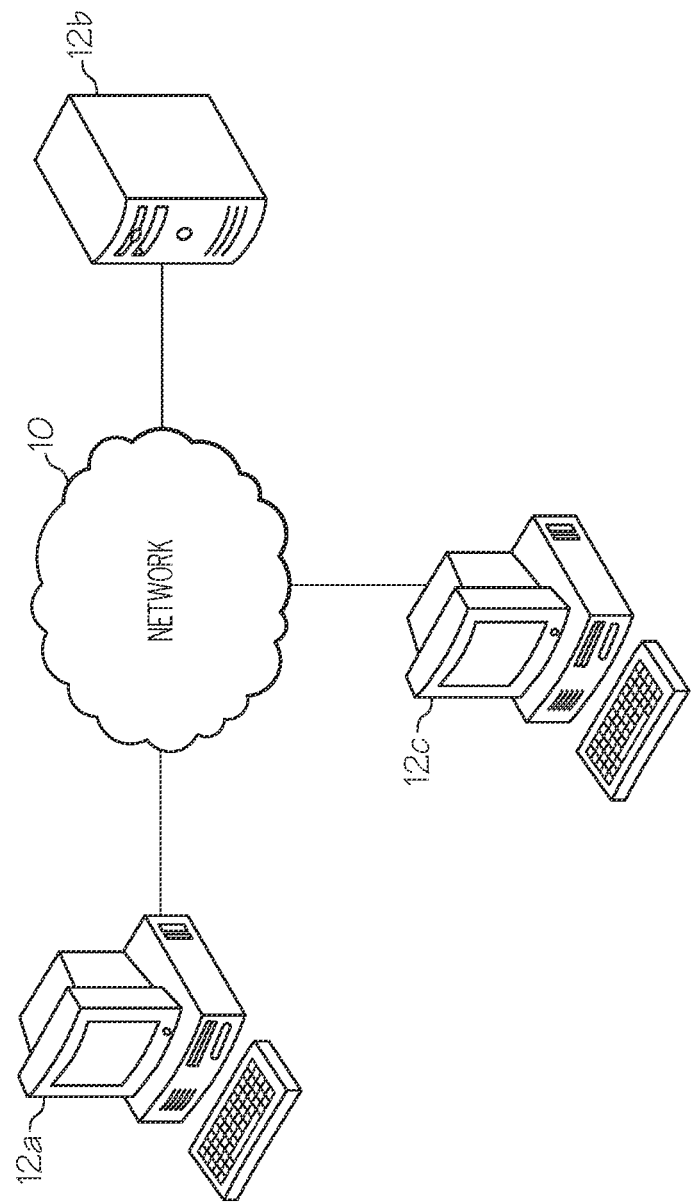
FIG. 1 schematically depicts an illustrative computing network to align quantitative and qualitative statistical information in documents, according to one or more embodiments shown and described herein.

Referring now to the figures, FIG. 1 depicts an illustrative computing network, illustrating components of a system for performing the functions described herein, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, and an administrator computing device 12c.

The user computing device 12a may be used to input information to be utilized to align quantitative and qualitative statistical information in documents, as disclosed herein. For example, the user computing device 12a may be a personal computer running software that a user utilizes to input an electronic document to be analyzed. For example, a user may load a word processing document, a PDF document, or other types of document to be analyzed, using the user computing device 12a. After a document is input into the user computing device 12a, the user computing device 12a or the server computing device 12b may perform the techniques disclosed herein to align quantitative and qualitative statistical information in the document. In some examples, the user computing device 12a may be a tablet, a smartphone, a smart watch, or any other type of computing device used by a user to input a document to be analyzed.

The administrator computing device 12c may, among other things, perform administrative functions for the server computing device 12b. In the event that the server computing device 12b requires oversight, updating, or correction, the administrator computing device 12c may be configured to provide the desired oversight, updating, and/or correction. The administrator computing device 12c, as well as any other computing device coupled to the computer network 10, may be used to input historical cost data or historical effect size data into a database.

The server computing device 12b may receive a document input into the user computing device 12a and may perform the techniques disclosed herein to align quantitative and qualitative statistical information in the document. The server computing device 12b may then transmit information to be displayed by the user computing device 12a based on the operations performed by the server computing device 12b. In some examples, the server computing device 12b may be removed from the system of FIG. 1 and may be replaced by a software application on the user computing device 12a. For example, the functions of the server computing device 12b may be performed by software operating on the user computing device 12a. In one example, the functions of the server computing device 12b may be performed by a plug-in that operates with word processing software. The components and functionality of the server computing device 12b will be set forth in detail below.

It should be understood that while the user computing device 12a and the administrator computing device 12c are depicted as personal computers and the server computing device 12b is depicted as a server, these are non-limiting examples. More specifically, in some embodiments any type of computing device (e.g., mobile computing device, personal computer, server, etc.) may be utilized for any of these components. Additionally, while each of these computing devices is illustrated in FIG. 1 as a single piece of hardware, this is also merely an example. More specifically, each of the user computing device 12a, the server computing device 12b, and the administrator computing device 12c may represent a plurality of computers, servers, databases, etc.

Figure 2:
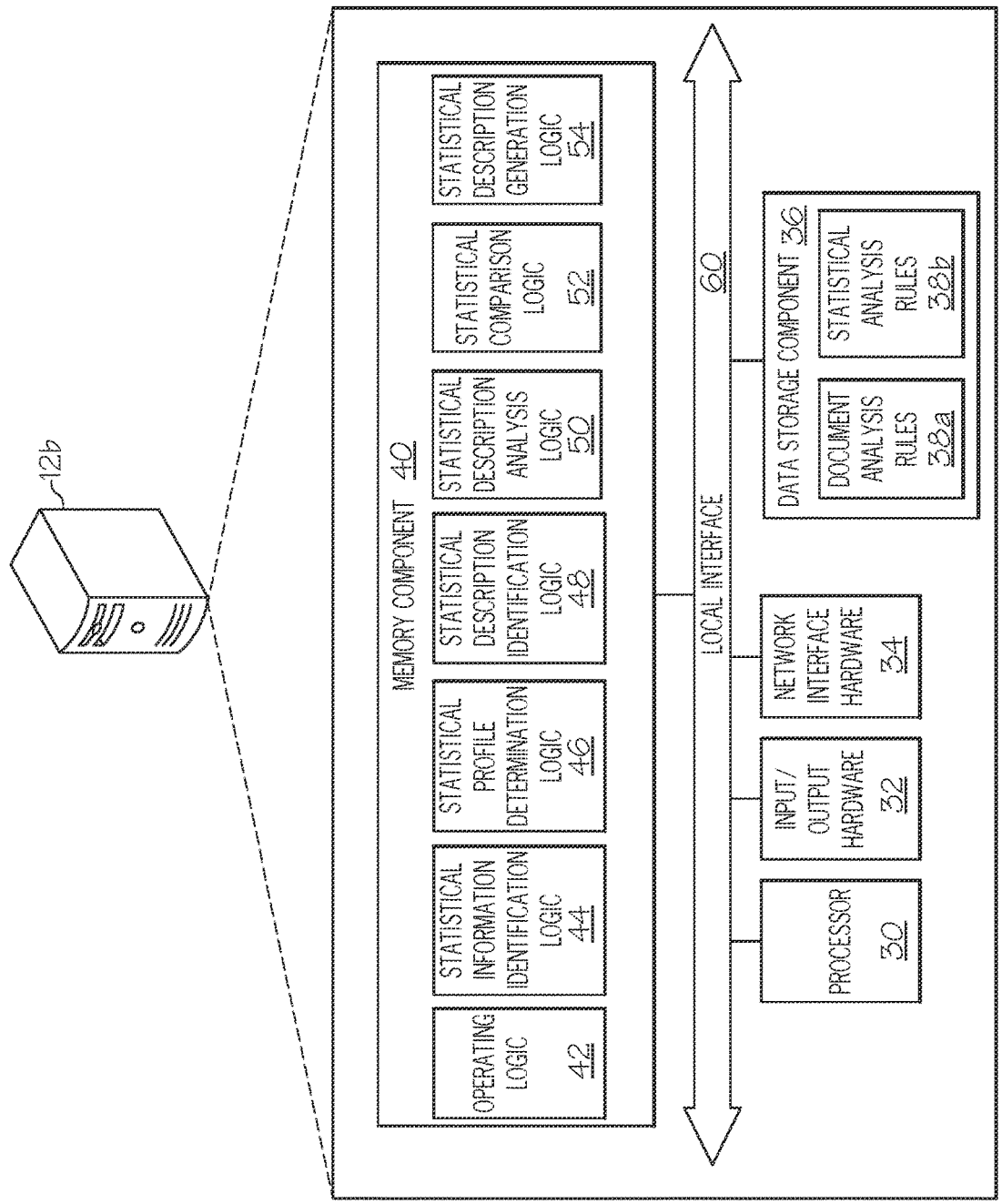
FIG. 2 schematically depicts the server computing device from FIG. 1, further illustrating hardware and software that may be used according to one or more embodiments shown and described herein.

FIG. 2 depicts additional details regarding the server computing device 12b from FIG. 1. While in some embodiments, the server computing device 12b may be configured as a general purpose computer with the requisite hardware, software, and/or firmware, in other embodiments, the server computing device 12b may be configured as a special purpose computer designed specifically for performing the functionality described herein.

As also illustrated in FIG. 2, the server computing device 12b may include a processor 30, input/output hardware 32, network interface hardware 34, a data storage component 36 (which may store document analysis rules 38a and statistical analysis rules 38b), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42, statistical information identification logic 44, statistical profile determination logic 46, statistical description identification logic 48, statistical description analysis logic 50, statistical comparison logic 52, and statistical description generation logic 54 (each of which may be embodied as a computer program, firmware, or hardware, as an example). A local interface 60 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data for access by the server computing device 12b and/or other components. As illustrated in FIG. 2, the data storage component 36 may store the document analysis rules 38a and the statistical analysis rules 38b, described in further detail below.

Included in the memory component 40 are the operating logic 42, the statistical information identification logic 44, the statistical profile determination logic 46, the statistical description identification logic 48, the statistical description analysis logic 50, the statistical comparison logic 52, and the statistical description generation logic 54. The operating logic 42 may include an operating system and/or other software for managing components of the server computing device 12b.

Figure 5:
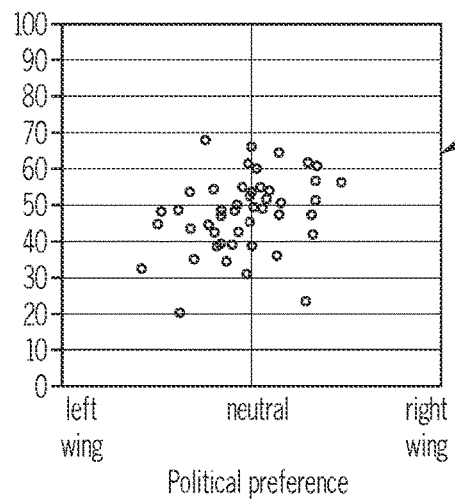
FIG. 5 depicts an example document that may be analyzed using the method and system disclosed herein.

The statistical information identification logic 44 may identify quantitative statistical information in an electronic document. In one example, the statistical information identification logic 44 may identify a graph or other visual representation of statistical information in an electronic document. In another example, the statistical information identification logic 44 may identify a textual representation of statistical information in an electronic document, such as a data table. Referring to FIG. 5, an example document 500, entitled "Commuting in the West" includes a graph 504 (referred to as FIG. 1 in the example of FIG. 5), which may be identified by the statistical information identification logic 44, using the techniques described herein.

In some examples, the statistical information identification logic 44 may analyze a document object model (DOM) of an electronic document to identify a graph or figure within the document. As used herein, a figure may comprise any type of visual or textual representation of statistical information (e.g., a bar graph, a pie chart, a scatter plot, a data table, and the like).

The statistical information identification logic 44 may utilize a DOM to identify statistical information in documents such as a web page or other document that uses HTML or XML, a PDF document, or other document that uses a structured system such with a DOM to organize information. In particular, the statistical information identification logic 44 may search the DOM of an electronic document and look for certain tags, phrases, or other indications of a graph or figure.

In some examples, the statistical information identification logic 44 may utilize the document analysis rules 38a in the data storage component 36 to determine which components of the DOM to search for to identify a graph or figure. For example, the document analysis rules 38a may specify certain HTML or XML tags that indicate a graph or figure. The document analysis rules 38a may specify different DOM components that specify different types of graphs or figures. For example, the document analysis rules 38a may specify one tag that indicates a bar graph and another tag that indicates a scatter plot. In some examples, the document analysis rules 38a may comprise regular expressions that the statistical information identification logic 44 may utilize to analyze the DOM to identify quantitative statistical information.

In some examples, the data storage component 36 may include different document analysis rules 38a for different types of documents (e.g., different rules for HTML documents and PDF documents). Accordingly, the statistical information identification logic 44 may access the appropriate document analysis rules 38a depending on the type of document being analyzed. The statistical information identification logic 44 may then search the DOM of the document based on the selected document analysis rules 38a to identify one or more graphs or figures in the document.

In some examples, the statistical information identification logic 44 may identify a graph or figure in a document that does not utilize a DOM. In these examples, the statistical information identification logic 44 may utilize image analysis techniques to identify graphs or figures in a document. In one example, the statistical information identification logic 44 may perform segmentation of a document and may utilize a classifier trained to identify different types of graphs or figures (e.g., bar graph, pie chart, scatter plot, and the like). For example, the statistical information identification logic 44 may identify certain image characteristics in a document indicative of different types of graphs.

In some examples, the statistical information identification logic 44 may identify text-based statistics in a document (e.g., a data table). In some examples, the statistical information identification logic 44 may access the document analysis rules 38a and select appropriate rules based on the document type to analyze the DOM of a document to identify text-based statistical information. In other examples, the statistical information identification logic 44 may access the document analysis rules 38a and select appropriate rules based on the document type to analyze the text of a document directly, without accessing the DOM, to identify text-based statistical information. For example, the statistical information identification logic 44 may analyze the text of a document and search for certain words or phrases that indicate a data table or other text-based statistical information.

Referring back to FIG. 2, the statistical profile determination logic 46 may determine a statistical profile associated with statistical information or a representation of statistical information identified by the statistical information identification logic 44. As described above, the server computing device 12b may determine whether descriptions of statistical information in a document match the actual statistical information in the document. Accordingly, in order to make this determination, the statistical profile determination logic 46 may perform statistical analysis of statistical information (e.g., a graph) in the document. The server computing device 12b may then compare the description of the statistical information to the actual statistical information, as disclosed herein.

The statistical profile determined by the statistical profile determination logic 46 may comprise one or more statistical relationships or results associated with statistical information. For example, if a representation of statistical information identified by the statistical information identification logic 44 comprises a graph, the statistical profile determination logic 46 may extract data from the graph and perform statistical analysis of the graph, as disclosed herein, and determine one or more statistical relationships or results that can be determined from the graph. If a representation of statistical information identified by the statistical information identification logic 44 is a data table, the statistical profile determination logic 46 may perform statistical analysis of the data from the table.

In some examples, the statistical profile determination logic 46 may access the statistical analysis rules 38b in the data storage component 36 to determine type of statistical analysis to perform. In embodiments, the statistical analysis rules 38b may include different types of statistical analysis to perform based on the type of statistical information being analyzed (e.g., based on the type of graph). For example, for a bar chart, the statistical analysis rules 38b may indicate that an effect size should be calculated. For a time series graph, the statistical analysis rules 38b may indicate that a slope of data items should be calculated. For a scatter plot, the statistical analysis rules 38b may indicate that a correlation between variables should be calculated. However, it should be understood that these are merely examples of rules that may be included in the statistical analysis rules 38b, and that in embodiments, any number of rules may be included for any number of different types of graphs, figures, data tables, or other representations of statistical information. In some examples, the statistical profile determined by the statistical profile determination logic 46 may comprise a single statistical result or relationship. However, in other examples, the statistical profile determined by the statistical profile determination logic 46 may comprise a plurality of statistical results and/or relationships.

In some examples, the statistical profile determination logic 46 may perform statistical analysis of statistical information based on a statistical description detected in the text of the document, using techniques described in further detail below. For instance, in the example of FIG. 5, a paragraph 502 of the document 500 indicates that "in FIG. 1, there is a strong correlation between political preference and commute times in the American West." Accordingly, in the example of FIG. 5, the statistical profile determination logic 46 may determine a correlation between political preference and commute times in the graph 504 (FIG. 1 in the example of FIG. 5) of the document 500. This may allow the server computing device 12b to determine whether the description of the statistics in the graph 504 contained in paragraph 502 of the document 500 are accurate, as explained in further detail below.

Referring back to FIG. 2, the statistical description identification logic 48 may identify a statistical description of statistical information (e.g., a graph) in a document. In one example, the statistical description identification logic 48 may identify a label of a graph or figure in the document. For instance, in the example of FIG. 5, the statistical description identification logic 48 may identify the label 506 ("FIG. 1" in the example of FIG. 5) associated with the graph 504. In some examples, the statistical description identification logic 48 may identify a label associated with a graph or figure by analyzing the DOM of the document. In other examples, the statistical description identification logic 48 may identify a label associated with a graph or figure by performing image and/or text analysis of the document. In other examples, the statistical description identification logic 48 may utilize other techniques to detect a label associated with a graph or figure.

After identifying a label associated with a graph or figure, the statistical description identification logic 48 may identify mentions of or reference to the label throughout the document. For instance, in the example of FIG. 5, the statistical description identification logic 48 may identify that the paragraph 502 of the document 500 refers to FIG. 1, which is the label 506 associated with the graph 504. In some examples, the statistical description identification logic 48 may analyze the DOM of the document to find mentions of the label throughout the document. In other examples, the statistical description identification logic 48 may perform image and/or text analysis of the document to find mentions of the label throughout the document. In other examples, statistical description identification logic 48 may utilize other techniques to find mentions of the label throughout the document.

In some examples, the statistical description identification logic 48 may identify mentions or descriptions of a graph or figure in a document that do not refer to a label associated with the graph or figure. For example, the text of a document may refer to the graph above or the figure below. In these examples, the statistical description identification logic 48 may identify relative position terms (e.g., above or below) or other textual references to identify a textual description of a graph or figure in the document.

After identifying a mention of or reference to a graph or figure (e.g., by finding a mention of a label associated with the graph or figure), the statistical description identification logic 48 may identify descriptive text that describes the graph or figure being mentioned or referenced. For instance, in the example of FIG. 5, the statistical description identification logic 48 may identify the descriptive text "As you can see in FIG. 1, there is a strong correlation between political preference and commute times in the American West" from paragraph 502 of the document 500.

Referring back to FIG. 2, the statistical description analysis logic 50 may analyze descriptive text identified by the statistical description identification logic 48 to identify a description of statistical information. In particular, the statistical description analysis logic 50 may determine statistics or statistical relationships implied by the descriptive text. In some examples, the statistical description analysis logic 50 may search for adjectives or other words in the identified descriptive text that relate to a graph or figure. In some examples, the statistical description analysis logic 50 may access a lookup table contained in the statistical analysis rules 38*b* in the data storage component 36 that translates qualitative descriptions to well known numeric representations. In some examples, the statistical description analysis logic 50 may utilize a language parser to identify different ways of describing a statistical relationship (e.g., down, lower, negative may be different words to describe a similar statistical phenomenon).

In the example of FIG. 5, the statistical description analysis logic 50 may analyze the text in the paragraph 502 of the document 500 and determine that the implied statistical relationship is a strong correlation between political preference and commute times in the data of the graph 504. The statistical description analysis logic 50 may then access a lookup table in the data storage component 36, which may indicate that a strong correlation implies a correlation of greater than 0.6, for example In other examples, a strong correlation may be interpreted as a correlation greater than some other threshold value.

Referring back to FIG. 2, the statistical comparison logic 52 may determine whether the statistical description determined by the statistical description analysis logic 50 matches the statistical profile determined by the statistical profile determination logic 46. In particular, the statistical comparison logic 52 may compare the statistics implied by descriptive text in the document, as determined by the statistical description analysis logic 50, to the statistics in a graph or figure that the descriptive text describes, as determined by the statistical profile determination logic 46. For instance, in the example of FIG. 5, the paragraph 502 indicates a strong correlation between political preference and commute times. However, based on the data from the graph 504, the correlation between political preference and commute time is only about 0.3. As such, in the example of FIG. 5, the statistical comparison logic 52 may determine that the statistical description of the graph 504 in paragraph 502 does not match the actual statistics of the graph 504.

Referring back to FIG. 2, the statistical description generation logic 54 may generate a description of a graph or figure in a document based on the statistical profile determined by the statistical profile determination logic 46. In particular, the statistical description generation logic 54 may generate a description of a graph or figure in a document when a description in the text of the document is either lacking of inaccurate. As described above, the statistical comparison logic 52 may determine whether a description of statistics in a graph or figure is accurate. If the statistical comparison logic 52 determines that the description is inaccurate, the statistical description generation logic 54 may generate an alternative descriptive text that accurately describes the statistics based on the statistical profile determined by the statistical profile determination logic 46.

For instance, in the example of FIG. 5, the paragraph 502 of the document 500 states that there is a strong correlation between political preference and commute times. However, in actuality, the statistical profile of the graph 504 (FIG. 1 in the document 500) may indicate that the correlation between political preference and commute times in only 0.3. Accordingly, the statistical description generation logic 54 may generate a description of the graph 504 stating that the correlation is only 0.3, which may be better described as a weak correlation.

As described above, the statistical analysis rules 38*b* in the data storage component 36 may include a lookup table that can translate a qualitative description to a numeric representation. Similarly, the statistical description generation logic 54 may utilize such a lookup table to translate a numeric representation to a qualitative description. For example, the lookup table may indicate that a correlation of 0.3 may be characterized as a weak correlation. After generating an appropriate statistical description, the statistical description generation logic 54 may cause the generated statistical description to be displayed to a user. In one example, an annotation may be added to the document to display the generated statistical description, such as the annotation 600 shown in FIG. 6. In other examples, other methods of displaying the statistical description may be used. In one example, a pop-up window may display the generated statistical description when a user hovers their mouse over certain descriptive text in a document (e.g., the paragraph 502 of the document 500 in FIGS. 5 and 6).

In embodiments, if a document includes a particular graph or figure but does not contain descriptive text describing the graph or figure, the statistical description generation logic 54 may generate descriptive text associated with the graph or figure based on the statistical profile determined by the statistical profile determination logic 46. In some examples, the statistical description generation logic 54 may access the statistical analysis rules 38*b* in the data storage component 36 to generate the descriptive text. For example, the statistical description generation logic 54 may access a lookup table in the statistical analysis rules 38*b*, described above, to determine a qualitative description based on a numerical value contained in the statistical profile. For example, the lookup table may indicate that a correlation below a first threshold value corresponds to a weak correlation and a correlation above a second threshold value corresponds to a strong correlation.

After the statistical description generation logic 54 generates descriptive text for a graph or figure that does not have a description in a document, the statistical description generation logic 54 may cause the generated descriptive text to be displayed to a user. In one example, the statistical description generation logic 54 may cause a pop-up window to appear with the descriptive text when a user hovers a mouse cursor over the corresponding graph or figure. In other examples, the statistical description generation logic 54 may cause the determined descriptive text to be displayed in other ways.

Figure 3:
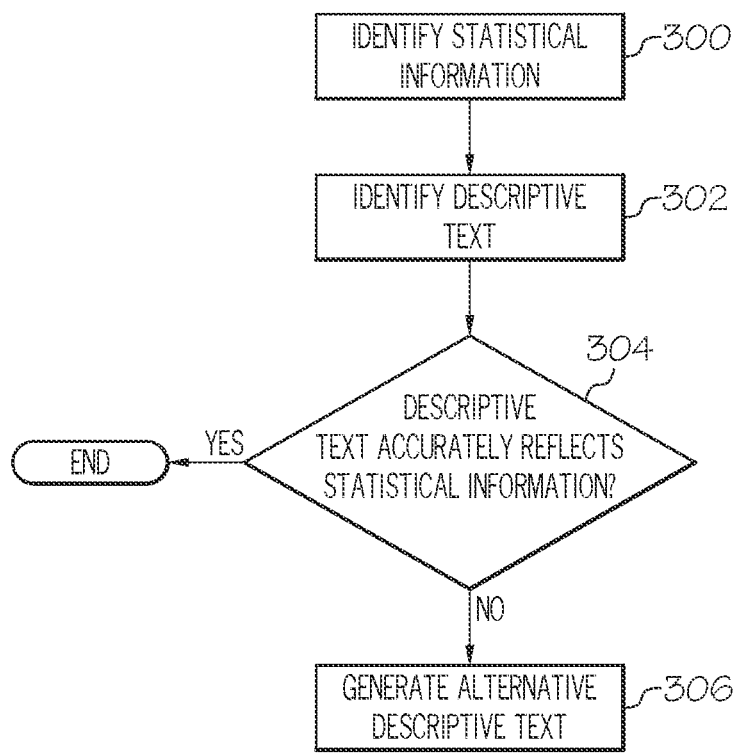
FIG. 3 depicts a flow diagram of an illustrative method of aligning quantitative and qualitative statistical information, according to one or more embodiments shown and described herein.

As mentioned above, the various components described with respect to FIG. 2 may be used to carry out one or more processes and/or provide functionality for aligning quantitative and qualitative statistics in documents. An illustrative example of the various processes is described with respect to FIG. 3. Although the steps associated with the blocks of FIG. 3 will be described as being separate tasks, in other embodiments, the blocks may be combined or omitted.

At step 300, the statistical information identification logic 44 identifies statistical information in a document. In one example, the statistical information identification logic 44 identifies a graph or other visual representation of statistical information. In another example, the statistical information identification logic 44 identifies a data table or other textual representation of statistical information. In some examples, the statistical information identification logic 44 utilizes a DOM of the document to identify statistical information. In other examples, the statistical information identification logic 44 utilizes image processing or other techniques to identify statistical information in the document. In the example of FIG. 5, the statistical information identification logic 44 may identify the graph 504 as a representation of statistical information.

At step 302, the statistical description identification logic 48 identifies descriptive text in the document associated with the statistical information identified by the statistical information identification logic 44. In particular, the statistical description identification logic 48 identifies descriptive text that describes the identified statistical information (e.g., text that describes statistical information in a graph). In the example of FIG. 5, the statistical description identification logic 48 may identify the descriptive text in paragraph 502 stating that FIG. 1 of document 500 shows a strong correlation between political preference and commute times.

At step 304, the statistical comparison logic 52 compares the descriptive text identified by the statistical description identification logic 48 and the statistical information identified by the statistical information identification logic 44. In particular, the statistical comparison logic 52 determines whether the descriptive text accurately describes the statistical information. If the descriptive text accurately describes the statistical information ("YES" at step 304), then the method of FIG. 3 ends. Alternatively, if the descriptive text does not accurately describe the statistical information ("NO" at step 304), then, at step 306, the statistical description generation logic 54 generates alternatively descriptive text that accurately describes the statistical information.

Figure 6:
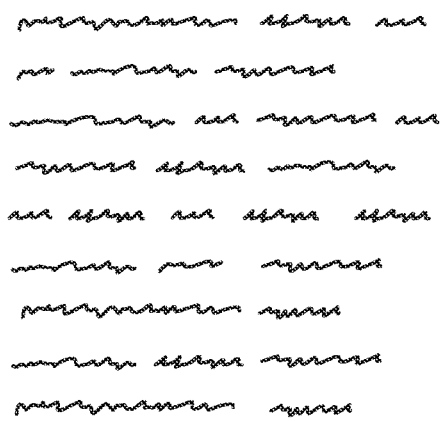
FIG. 6 depicts an example output that may be displayed on the document of FIG. 5, according to one or more embodiments shown and described herein.

In the example of FIG. 5, the statistical comparison logic 52 may compare the description in paragraph 502 that FIG. 1 of document 500 indicates a strong correlation between political preference and commute times to the actual correlation between political preference and commute times in the graph 504. In the example of FIG. 5, the statistical comparison logic 52 may determine that the graph 504 actually shows a correlation between political preference and commute times of about 0.3, which can be characterized as a weak correlation. Accordingly, in the example of FIG. 5, the statistical comparison logic 52 may determine that the descriptive text in paragraph 502 does not accurately describe the statistical information in graph 504. Thus, in the example of FIG. 5, the statistical description generation logic 54 may generate the annotation 600, as shown in FIG. 6, that accurately describes the statistical information in the graph 504.

Figure 4:
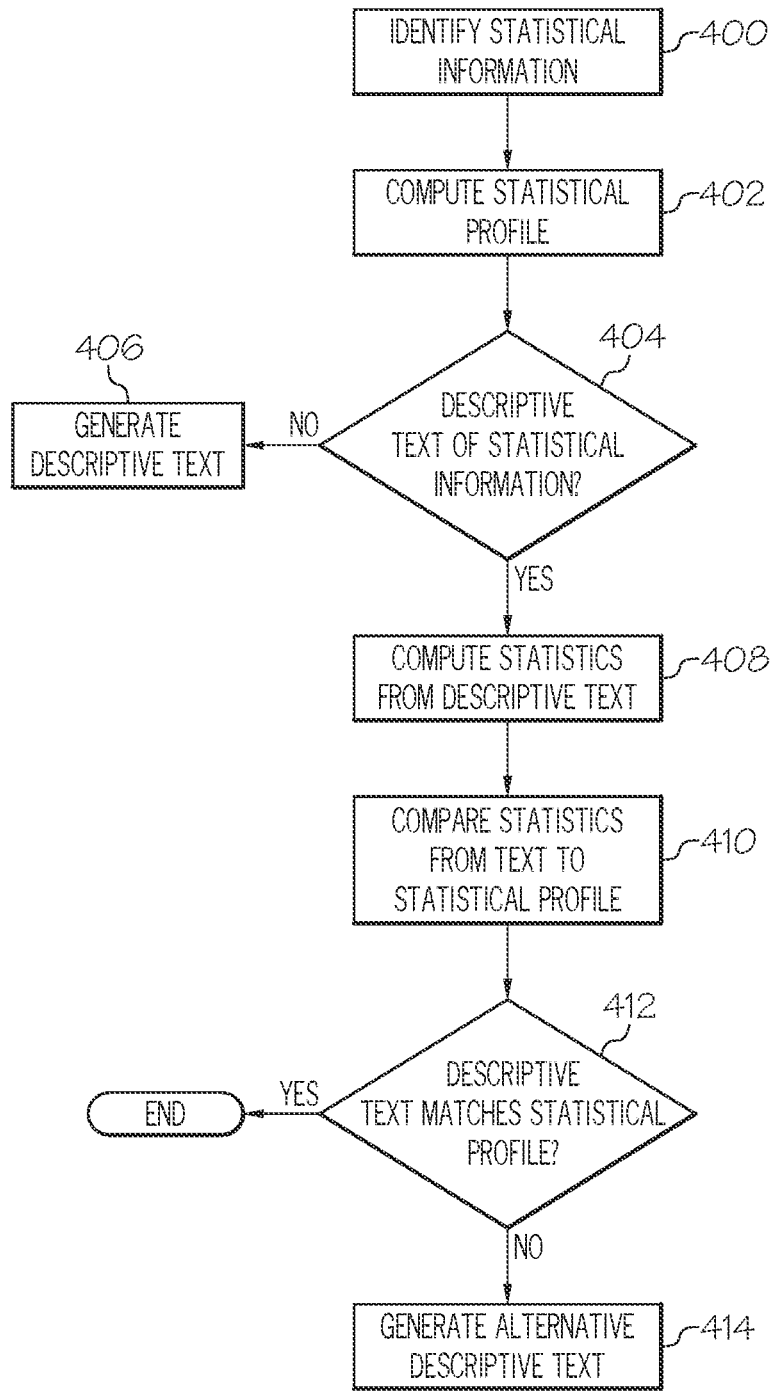
FIG. 4 depicts a flow diagram of another illustrative method of determining the value of scientific expertise in large scale experimentation, according to one or more embodiments shown and described herein.

An illustrative example of another process for aligning quantitative and qualitative statistics in documents is shown in FIG. 4. At step 400, the statistical information identification logic 44 identifies statistical information in a document (e.g., a graph, a data table, or other representations of statistical information). In the example of FIG. 5, the statistical information identification logic 44 may identify the graph 504.

At step 402, the statistical profile determination logic 46 computes a statistical profile of the statistical information identified by the statistical information identification logic 44. The statistical profile may comprise one or more statistical results or relationship based on the identified statistical information. In the example of FIG. 5, the statistical profile determination logic 46 may compute a correlation between political preference and commute times based on the data in the graph 504.

At step 404, the statistical description identification logic 48 determines whether the document contains any descriptive text that describes the statistical information identified by the statistical information identification logic 44. In one example, the statistical description identification logic 48 may identify a label associated with the identified statistical information (e.g., a figure label) and then searches the text of the document for mentions of the identified label. In other examples, the statistical description identification logic 48 may utilize other techniques to find descriptions of the identified statistical information in the text of the document. In the example of FIG. 5, the statistical description identification logic 48 may identify the label 'FIG. 1' associated with the graph 504 and may identify the text in paragraph 504 of the document 500 that refers to the label 'FIG. 1'.

If the statistical description identification logic 48 determines that the document does not contain any descriptive text that describes the identified statistical information ("NO" at step 404), then at step 406, the statistical description generation logic 54 generates descriptive text that describes the identified statistical information. In some examples, the statistical description generation logic 54 may utilize a lookup table from the statistical analysis rules 38b stored in the data storage component 36 to generate the descriptive text. After the descriptive text is generated, the statistical description generation logic 54 may cause the generated descriptive text to be displayed to a user.

If the statistical description identification logic 48 determines that the document does contain descriptive text that describes the identified statistical information ("YES") at step 404), then the statistical description identification logic 48 identifies the descriptive text that describes the identified statistical information and, at step 408, the statistical description analysis logic 50 analyzes the identified descriptive text and computes statistics implied from the descriptive text. In some examples, the statistical description analysis logic 50 may utilize the statistical analysis rules 38b in the data storage component 36 to compute the statistics implied from the descriptive text. In the example of FIG. 5, the statistical description identification logic 48 may identify the text in paragraph 502 that describes the graph 504. The statistical description analysis logic 50 may then computer statistics associated with the text of paragraph 502. For example, the statistical description analysis logic 50 may determine that a textual description of a strong correlation indicates a correlation of greater than 0.6.

At step 410, the statistical comparison logic 52 compares the statistics determined by the statistical description analysis logic 50 based on the descriptive text to the statistical profile determined by the statistical profile determination logic 46. In particular, the statistical comparison logic 52 determines whether the statistics determined from the descriptive text match the statistical profile (e.g., whether the descriptive text accurately describes the statistical information). In the example of FIG. 5, the statistical comparison logic 52 may compare the correlation implied by the text of paragraph 502 (e.g., a correlation of greater than 0.6) to the actual correlation in the graph 504 (e.g., a correlation of about 0.3).

If the statistical comparison logic 52 determines that the descriptive text matches the statistical profile ("YES" at step 412), then the method of FIG. 4 ends. Alternatively if the statistical comparison logic 52 determines that the descriptive text does not match the statistical profile ("NO" at step 412), then, at step 414, the statistical description generation logic 54 generates alternative descriptive text that accurately describes the statistical information. In some examples, the statistical description generation logic 54 utilizes the statistical analysis rules 38b to generate the alternative descriptive text. The statistical description generation logic 54 may then cause the generated alternative descriptive text to be displayed to a user. In the example of FIG. 5, the statistical description generation logic 54 may generate the alternative descriptive text shown in the annotation 600 of FIG. 6. The statistical description generation logic 54 may then cause the annotation 600 to be displayed, as shown in FIG. 6.

It should now be understood that embodiments described herein are directed to a method and system to align quantitative and qualitative statistical information in documents. An electronic document may be analyzed to identify a graph or other statistical information as well as a descriptive text that describes the graph or other statistical information. If the descriptive text does not accurately describe the statistical information, alternative descriptive text may be generated that accurately describes the statistical information. If no descriptive text exists that describes the statistical information, then new descriptive text may be generated that describes the statistical information.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
identifying a representation of first statistical information in a document;
identifying descriptive text within one or more paragraphs of the document that describes the first statistical information;
identifying second statistical information based on the descriptive text;
performing a comparison between the first statistical information and the second statistical information;
determining whether the descriptive text accurately describes the first statistical information based on the comparison; and
upon determination that the descriptive text does not accurately describe the first statistical information, generating alternative descriptive text that accurately describes the first statistical information.

2. The method of claim 1, wherein the representation of the first statistical information comprises a graph.

3. The method of claim 2, further comprising:
extracting data from the graph; and
determining whether the descriptive text accurately describes the first statistical information based on the extracted data.

4. The method of claim 1, wherein the representation of the first statistical information comprises a data table.

5. The method of claim 1 further comprising:
identifying the representation of the first statistical information based on a document object model associated with the document.

6. The method of claim 1, further comprising:
identifying the representation of the first statistical information by performing image analysis of the document.

7. The method of claim 1, further comprising:
computing a statistical profile based on the first statistical information; and
determining whether the descriptive text accurately describes the first statistical information based on the statistical profile.

8. The method of claim 7, wherein the statistical profile comprises one or more statistical results or statistical relationships associated with the first statistical information.

9. The method of claim 8, wherein the statistical profile comprises different statistical results or statistical relationships based on a type of the first statistical information.

10. The method of claim 9, further comprising:
computing the statistical profile based on a lookup table that associates the type of the first statistical information with the one or more statistical results or statistical relationships.

11. The method of claim 1, further comprising:
upon determination that the document does not contain descriptive text that describes the first statistical information, generating descriptive text that describes the first statistical information.

12. The method of claim 1, further comprising:
identifying a label associated with the representation of the first statistical information; and
identifying the descriptive text that describes the first statistical information by identifying one or more references to the identified label in the document.

13. The method of claim 1, further comprising:
identifying the second statistical information based on a lookup table that associates one or more qualitative descriptions to one or more numeric representations.

14. The method of claim 1, further comprising:
generating the alternative descriptive text based on a lookup table that associates one or more types of statistical information with one or more qualitative descriptions.

15. A system comprising:
a processing device, and
a non-transitory, processor-readable storage medium comprising one or more programming instructions stored thereon that, when executed, cause the processing device to:
identify a representation of first statistical information in a document;
identify descriptive text within one or more paragraphs of the document that describes the first statistical information;
identify second statistical information based on the descriptive text;
perform a comparison between the first statistical information and the second statistical information;
determine whether the descriptive text accurately describes the first statistical information based on the comparison; and
upon determination that the descriptive text does not accurately describe the first statistical information, generate alternative descriptive text that accurately describes the first statistical information.

16. The system of claim 15, wherein the instructions further cause the processing device to:
compute a statistical profile comprising one or more statistical results or statistical relationships associated with the first statistical information; and
determine whether the descriptive text accurately describes the first statistical information based on the statistical profile.

17. The system of claim 15, wherein the instructions further cause the processing device to:
upon determination that the document does not contain descriptive text that describes the first statistical information, generate descriptive text that describes the first statistical information.

18. The system of claim 15, wherein the instructions further cause the processing device to:
identify a label associated with the representation of the first statistical information; and
identify the descriptive text that describes the first statistical information by identifying one or more references to the identified label in the document.

* * * * *

UNITED STATES PATENT AND TRADEMARK OFFICE
CERTIFICATE OF CORRECTION

PATENT NO. : 12,056,946 B2
APPLICATION NO. : 17/400777
DATED : August 6, 2024
INVENTOR(S) : Scott Carter, Alexandre Filipowicz and Rumen Iliev It is certified that error appears in the above-identified patent and that said Letters Patent is hereby corrected as shown below:

In the Specification

In Column 8, Line(s) 43, after "lacking", delete "of" and insert --or--, therefor.

In the Claims

In Column 12, Line(s) 48, Claim 5, after "claim 1", insert --,--.

Signed and Sealed this
Seventeenth Day of September, 2024

Katherine Kelly Vidal
*Director of the United States Patent and Trademark Office*